(12) United States Patent
Liao

(10) Patent No.: US 7,782,588 B2
(45) Date of Patent: Aug. 24, 2010

(54) SERIES SURGE SUPPRESSION STRUCTURE

(75) Inventor: Shun An Liao, Jhonghe (TW)

(73) Assignee: Anmax Lightning Technology Corp. (TW)

( * ) Notice: Subject to any disclaimer, the term of this patent is extended or adjusted under 35 U.S.C. 154(b) by 170 days.

(21) Appl. No.: 12/236,873

(22) Filed: Sep. 24, 2008

(65) Prior Publication Data

US 2009/0109585 A1    Apr. 30, 2009

(30) Foreign Application Priority Data

Oct. 30, 2007   (TW) ............................ 96218227 U

(51) Int. Cl.
*H01C 7/12* (2006.01)

(52) U.S. Cl. ........................ 361/118; 361/119

(58) Field of Classification Search .......... 361/118–120
See application file for complete search history.

(56) References Cited

U.S. PATENT DOCUMENTS 5,379,177 A * 1/1995 Bird ............................ 361/118
6,229,226 B1 * 5/2001 Kramer et al. ............. 307/10.1
6,606,231 B2 * 8/2003 Rumer ........................ 361/119

* cited by examiner

*Primary Examiner*—Danny Nguyen
(74) *Attorney, Agent, or Firm*—Connolly Bove Lodge & Hutz

(57) ABSTRACT

A series surge suppression structure mainly comprises: a circuit board, a ground line and a plurality of galvanization circuits being disposed thereon, a multilayer surge absorption unit being disposed in series on the ground line and the plurality of galvanization circuits; wherein each surge absorption unit is constituted by a pair of chokes with a layered surge absorption element connected in parallel between one end of either choke and the ground line; a power connection terminal, positioned on one side of the circuit board and electrically connected to a final end of the multilayer surge absorption unit; and a protection terminal, positioned on another side of the circuit board and electrically connected to a final end at another side of the multilayer surge absorption unit; whereby, the protection terminal can be used to connect with a communication circuit or an electric facility and the power connection terminal is used for connecting with an external wire so as to form a multilayer surge absorption protection by means of series connection. Meanwhile, a derivative module may be conveniently manufactured to allow multiple modules to be connected together and expand to use as a three-phase multilayer surge absorption protection thereby expanding a use range to attain to the surge substantially suppressing effect.

14 Claims, 7 Drawing Sheets

SERIES SURGE SUPPRESSION STRUCTURE

BACKGROUND OF THE INVENTION

1. Field of the Invention

The present invention relates to a series surge suppression structure using a clamp voltage and energy storage method to allow remnant voltage and remnant energy of a surge entering a protected facility to be reduced substantially to attain to the complete protection effect. A specific circuit put into practice by the present invention can be applied on a power source input/output terminal and signal input/output terminal. It has a protection effect better than a conventional one on the surge suppression.

2. Description of Related Art

Generally, a surge comes from two sources: one is lightning surge yielded from thunder cloud discharge and another is a switching surge yielded from a switching operation of power systems facilities. The surge itself has characteristics of instant high voltage, large current and big energy; the surge voltage may be high up to several 100 kV and the discharge current may also be high up to several 10 kA. Furthermore, because the rising time of a surge waveform is microsecond level and the duration time is 10 microseconds level, the surge has a potential danger to an electronic facility, no matter what it is a induced surge voltage occurred due thunder cloud to thunder cloud discharge or thundercloud to ground discharge, or a switching surge voltage occurred due the operation of power systems facilities itself. The operation of electronic facilities, power facilities or communication facilities will be unstable while being invaded by the surge, or even malfunction (susceptibility interference), and the most serious situation cause terminal elements, electronic facilities, power facilities and communication facilities damaged (vulnerability interference). Therefore, electronic facilities, communication facilities and power facilities are mostly adopted and added with a surge absorber to protect the facilities from damage.

Conventional surge suppression is usually achieved by adopting a gas tube or a metal oxide varistor (MOV) surge suppression element, and a technology it uses almost adopts a parallel mode connection manner. But, in fact, it still cannot have an effective process to discharge current of the surge; the protection effect is not good such that the remnant surge current will still flow into the protected facility to cause a considerable damage. Especially, a several high price facilities frequently cost ten million to one hundred million dollars for each, if there is no good protection added thereon, the damage should be very serious and unable to be estimated once being attacked by the surge.

SUMMARY OF THE INVENTION

For improving the current surge suppression method in which only a surge suppression element is simply used, reducing substantially remnant energy entering in protected facilities and overcoming the deficits generated from a parallel mode connection use of the conventional surge suppression method mentioned above, the present invention is proposed. The present invention undertakes an energy process to a surge; it is namely that surge voltage and discharge current are processed simultaneously to reduce remnant voltage and remnant energy of the surge effectively so as to attain to the substantial surge suppression effect.

For attaining to the objects mentioned above, the prevent invention proposes a series surge suppression structure, mainly comprising:

a circuit board, a ground line and a plurality of galvanization circuits being disposed thereon, a multilayer surge absorption unit being disposed in series on the ground line and the plurality of galvanization circuits; wherein each surge absorption unit is constituted by a pair of chokes with a layered surge absorption element connected in parallel between one end of either choke and the ground line; a power connection terminal, positioned on one side of the circuit board and electrically connected to a final end of the multilayer surge absorption unit; and a protection terminal, positioned on another side of the circuit board and electrically connected to a final end at another side of the multilayer surge absorption unit; whereby, the protection terminal can be used to connect with a communication circuit or an electric facility and the power connection terminal is used for connecting with an external wire so as to form a multilayer surge absorption protection by means of series connection. Meanwhile, a derivative module may be conveniently manufactured to allow multiple modules to be connected together and expand to use as a three-phase multilayer surge absorption protection thereby expanding a use range to attain to the surge substantially suppressing effect.

The most importance is that not only the surge suppressing effect can be accurately figured out but also a product conforming to customization can be manufactured if the present invention is applied such that a surge suppression structure according to the present invention can be applied broadly in various communication circuits and electric facilities, can avoid a damage of a surge invasion effectively and allows a machine to maintain a normal operation and the use thereof to be extended.

BRIEF DESCRIPTION OF THE DRAWINGS

The present invention can be more fully understood by reference to the following description and accompanying drawings, in which.

DETAILED DESCRIPTION OF THE PREFERRED EMBODIMENTS

Figure 1:
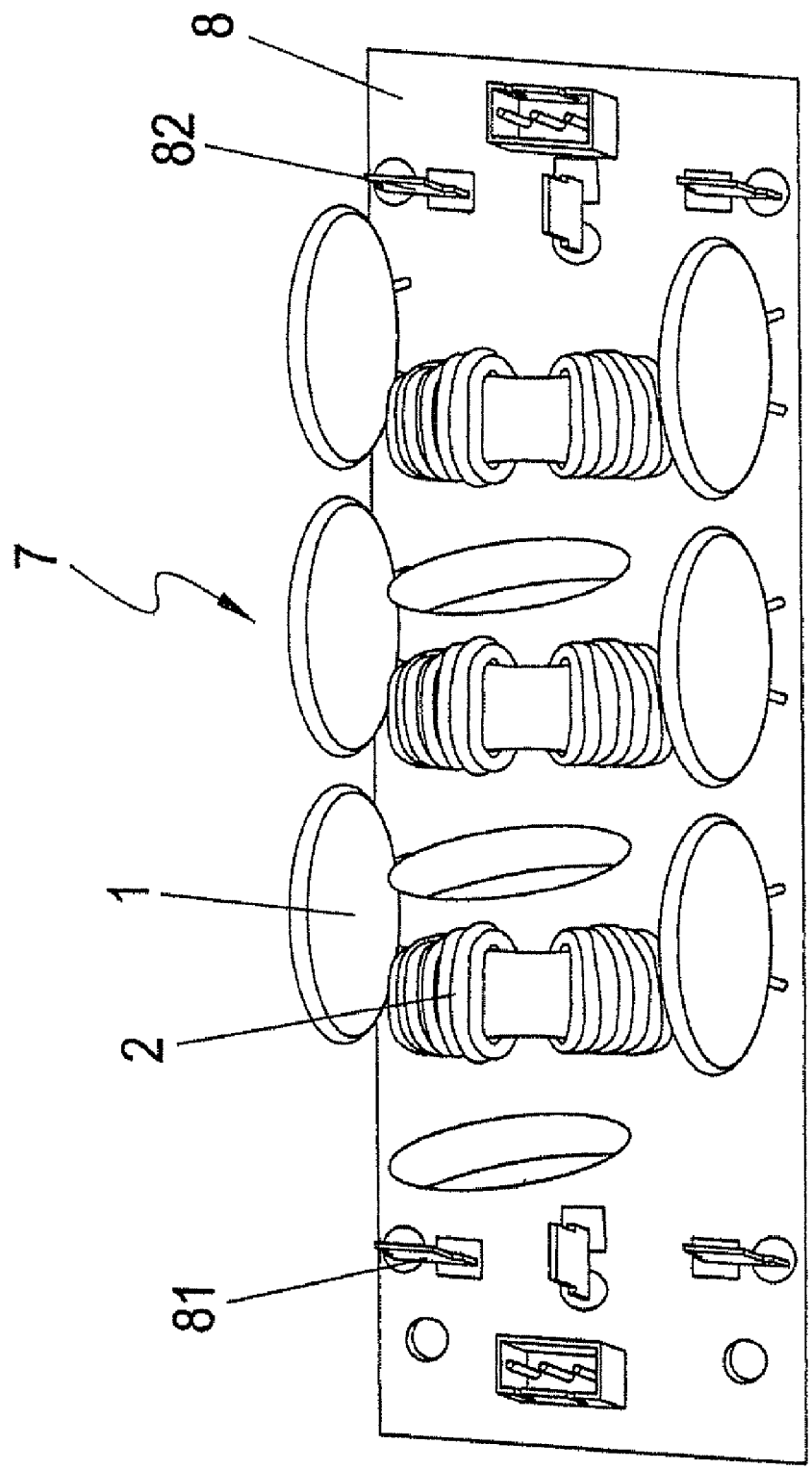
FIG. 1 is an schematically perspective view, showing a surge suppression structure according to the present invention.
Figure 2:
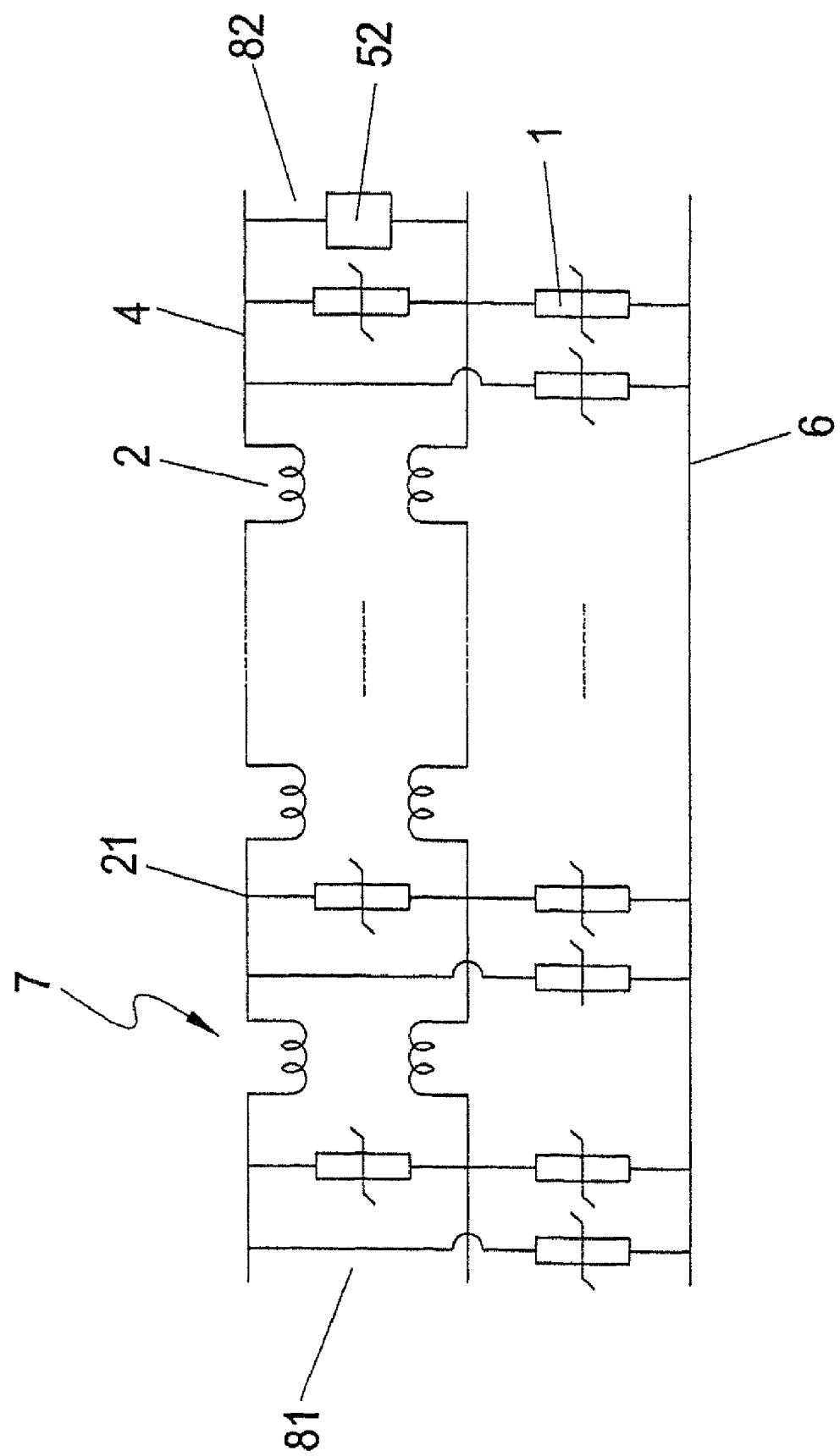
FIG. 2 is a diagram, showing a circuit of a surge suppression structure according to the present invention.
Figure 7:
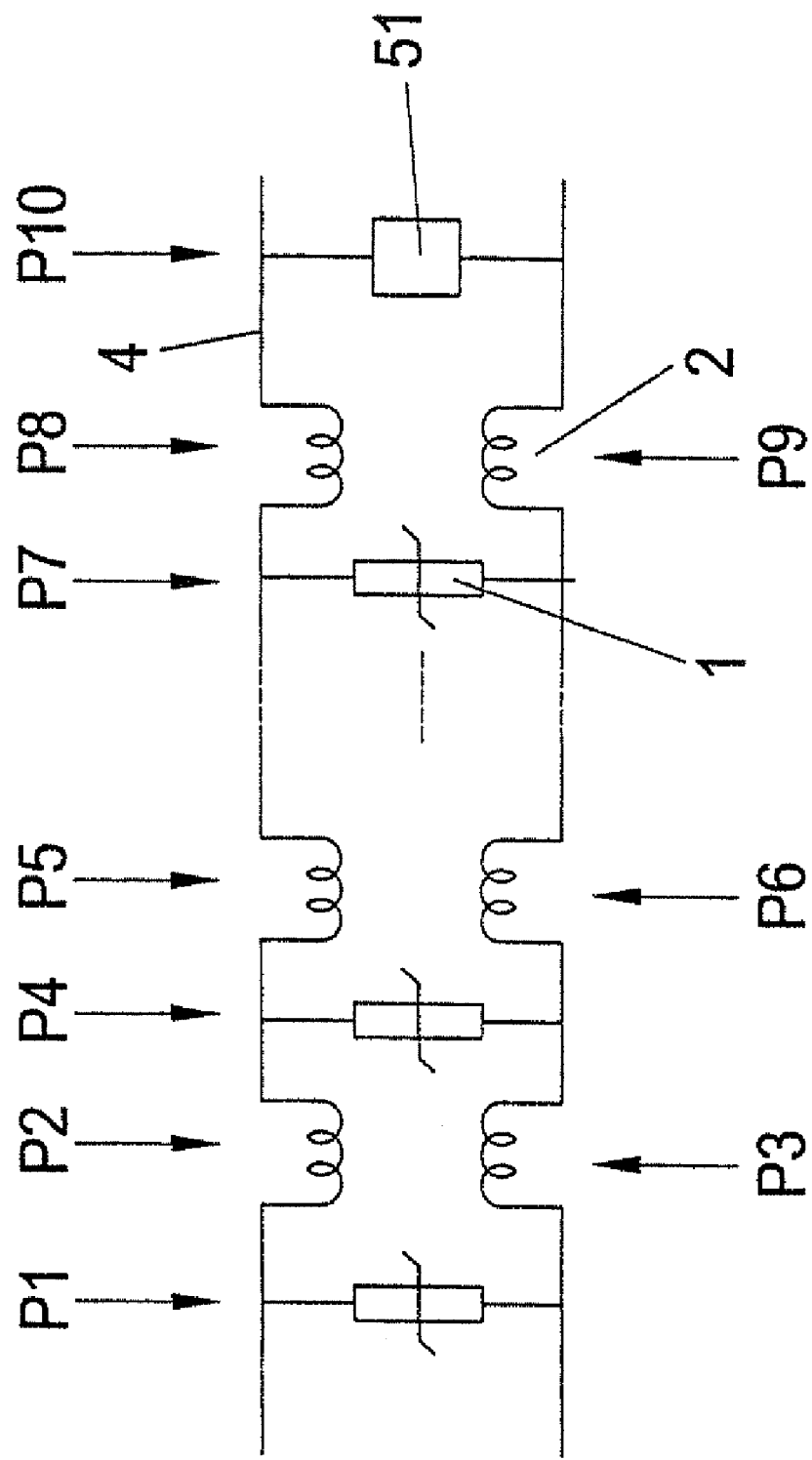
FIG. 7 is a diagram, showing a basic circuit of a surge suppression structure according to the present invention.

Please refer to FIGS. 1 to 7. A series surge suppression structure mainly comprises:

a circuit board 8, a ground line 6 and a plurality of galvanization circuits 4 being disposed thereon, a multilayer surge absorption unit 7 being disposed in series on the ground line 6 and the plurality of galvanization circuits 4;

wherein each surge absorption unit 7 is constituted by a pair of chokes 2 with a layered surge absorption element 1 connected in parallel between one end of either choke 2 and the ground line 6;

a power connection terminal 81, positioned on one side of the circuit board 8 and electrically connected to a final end of the multilayer surge absorption unit 7; and a protection terminal 82, positioned on another side of the circuit board 8 and electrically connected to a final end at another side of the multilayer surge absorption unit 7;

whereby, the protection terminal 82 can be used to connect with a communication circuit 51 (as FIG. 7 shows) or an electric facility 52 (as FIG. 2 shows) and the power connection terminal 81 is used for connecting with an external wire to allow the multilayer surge absorption unit 7 on the circuit board 8 to be disposed in series between the external wire and the communication circuit 51 or the electric facility 52 to form the multiple surge absorption protection.

Especially, according to the such kind of series surge suppression method, the surge suppression elements 1 (MOVs) and the chocks 2 in the surge absorption unit 7 may constitute a multilayer clamp voltage and tank circuit so as to be able to be used for decreasing a remnant voltage and remnant energy to achieve the surge substantially decreasing effect such that the facility can be accurately effectively protected to prevent the damage of surge invasion to enable a machine or a facility to maintain a normal operation.

While being put into practice, as FIG. 2 shows, the number of the galvanization circuits 4 is two, but it may be more than two theoretically. Furthermore, the surge suppression elements 1 at each layer assume a delta type disposition, but they may also assume a Y-typed disposition.

Figure 3:
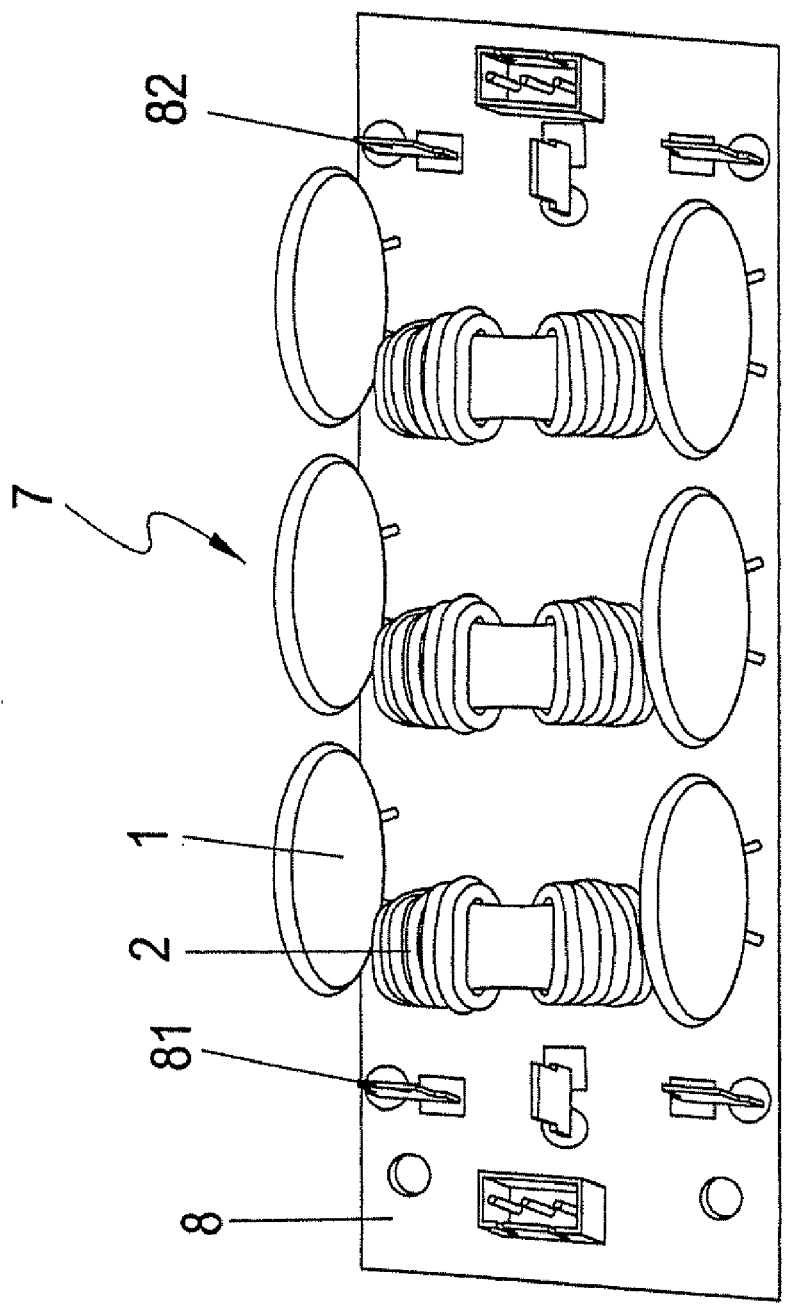
FIG. 3 is an schematically perspective view, showing a second kind of arrangements of elements on a circuit board according to the present invention.
Figure 4:
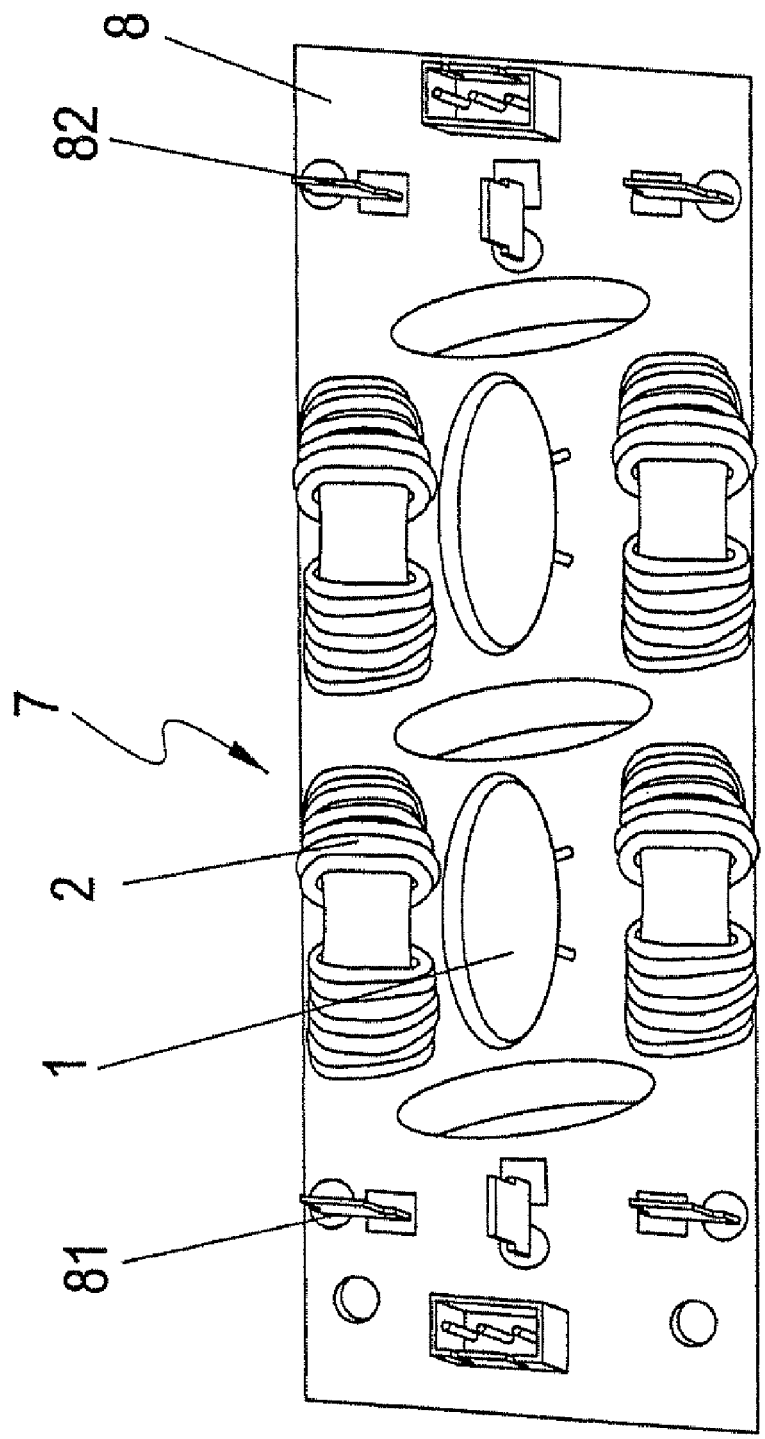
FIG. 4 is an schematically perspective view, showing a third kind of arrangements of elements on a circuit board according to the present invention.

Besides, as FIG. 1 shows, the surge suppression elements 1 and the chokes 2 are distantly disposed on the circuit board 8 by means of alternate permutation. Besides, only the chokes 2 may be disposed on a middle part of the circuit board 8 by a distance and the surge suppression elements 1 are respectively disposed on two sides of the circuit board 8 by a distance as FIG. 3 shows. Otherwise, the surge suppression elements are allowed to be disposed on a middle part of the circuit board 8 by a distance and the chokes 2 are respectively disposed on two sides of the circuit board 8 by a distance as FIG. 4 shows.

The structure of the present invention is very practical in fact and has a very good effect to the surge suppression; it may be broadly applied in various different electronic facilities or communication facilities with a different working voltage (including AC and DC) and a working current. Furthermore, it is more important that on an entire planning design of the structure, a corresponding product may be manufactured by calculating the following detailed formula while the present invention is put into practice to provide the best surge suppressing effect to different use requirements.

Please refer to FIG. 2 again. The circuit is constituted by coupling the multiple sets of surge suppression elements 1 (MOVs) to the chokes 2 by means of a continuous series connection, in which the plurality of surge suppression elements 1 are connected in parallel by a distance by means of a multilayer type to relative connection points 21 of the ground line 6 and the chokes 2 connected in series with the plurality of galvanization circuits 4, and extended to L-N, L-G and N-G to form a balance structure. In the figure, the surge suppression elements 1 at each layer assume a delta type disposition (but they may assume a Y-typed disposition); it may then be applied to an AC low voltage single phase facility by combining the layers together to use as a protector for a general electric facility 52 or a facility similar thereto.

Figure 5:
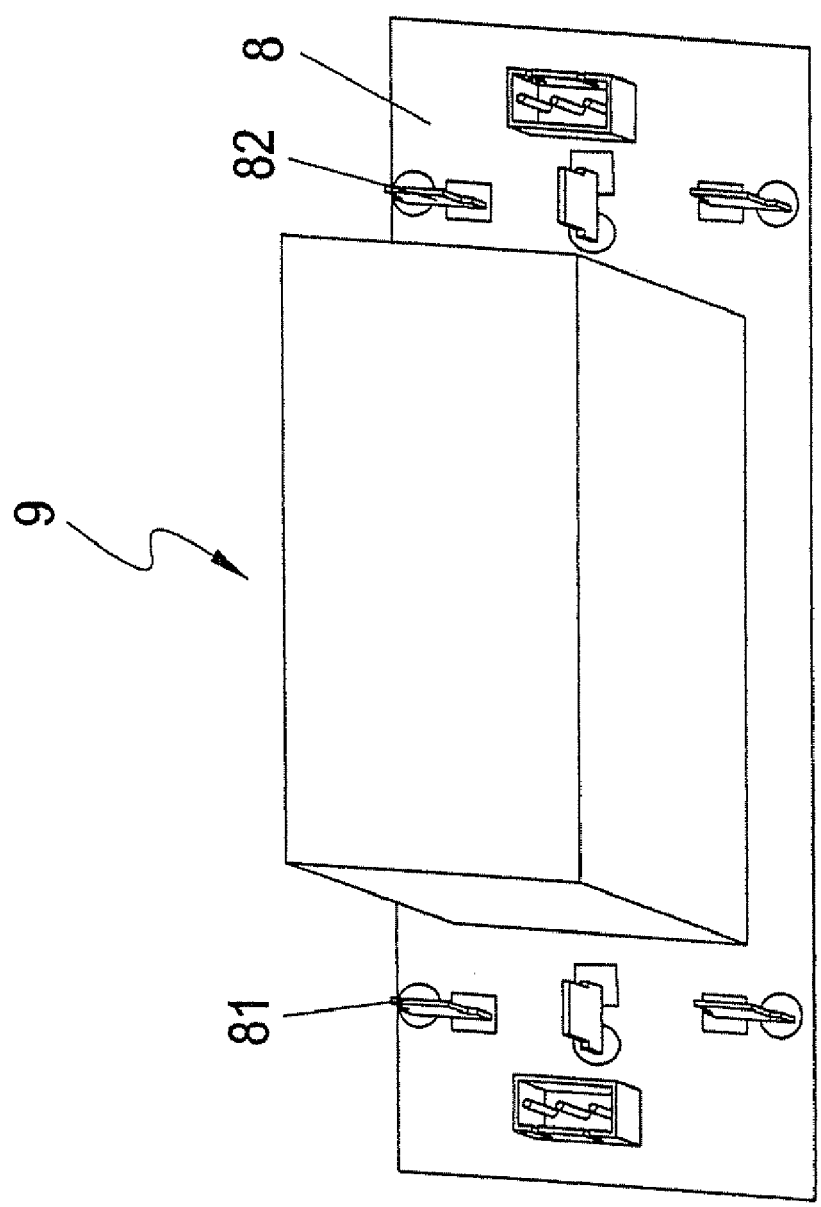
FIG. 5 is an schematically perspective view, showing a module established by a surge suppression structure according to the present invention.

Besides, as FIG. 5 shows, the circuit of the present invention shown in FIG. 2 may be manufactured into a modular product by means of a common standard specification so as to allow a user to select and combine it with various different power specifications of electric facilities. For example, the modular product may be used for protection to an AC high voltage three-phase facility or put into practice by coupling a power reactor to a lightning protector.

Please refer to FIGS. 1, 2 and 5 again. FIG. 5 is a schematic view of a derivative application of a modular product manufactured from the circuit shown in FIG. 2. Each module 9 is constituted by a circuit board 8 with a ground line 6 and a plurality of galvanization circuits 4 disposed thereon and a multilayer surge absorption unit 7 is disposed on the ground line 6 and the plurality of galvanization circuits. A power connection terminal 81 is disposed at one side of each module 9, and a protection terminal 82 is disposed at another side thereof; the power connection terminal 81 is also disposed on one side of the circuit board 8 and electrically connected with a final end of the multilayer surge absorption unit 7, and the protection terminal 82 is also disposed on another side of the circuit board and electrically connected with a final end of another side of the multilayer surge absorption unit 7.

Figure 6:
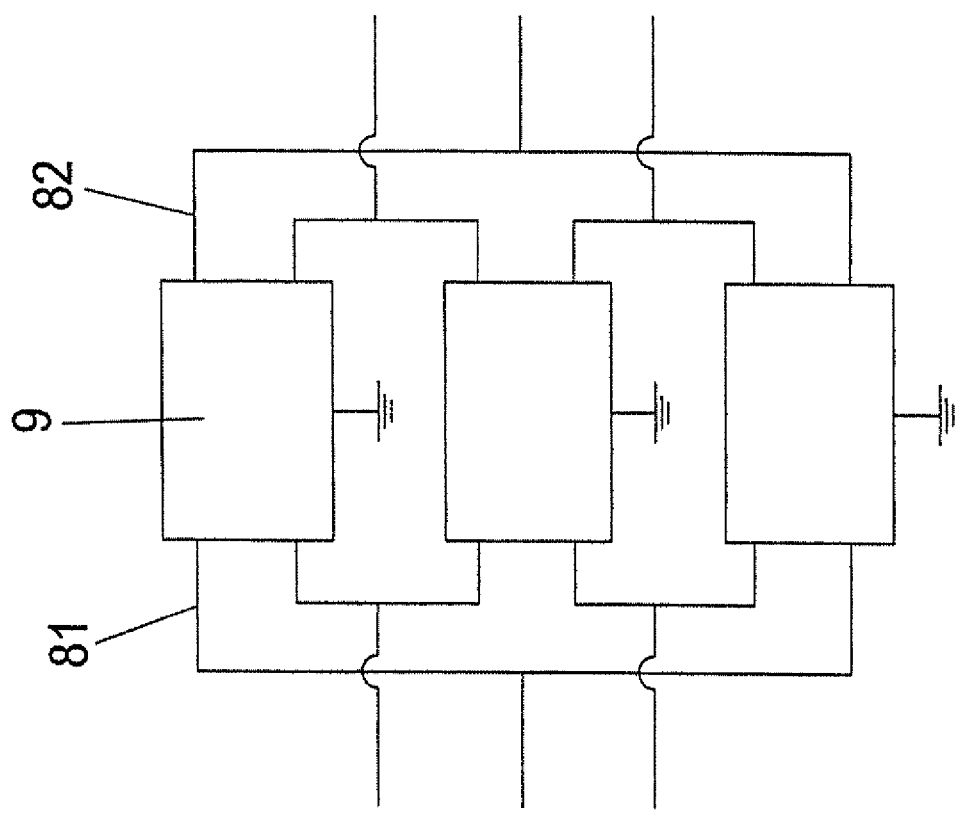
FIG. 6 is a block diagram, showing a circuit of an expansion application of modules in 3phase delta connection according to the present invention.

Please refer to FIG. 6. When the present invention is put into practice, three (or multiple) modules are disposed in parallel, and the protection terminals are disposed by connecting them together with a delta type and then connected to an electric facility 52, and the power connection terminals 81 are also disposed by connecting them together with a delta type and then connected to an external wire. Thereafter, the structure mentioned above can be used on three-phase series-connection multilayer surge absorption protection. The delta type is shown in the figure, but the aforementioned structure may assume a Y-typed disposition.

The detailed description of how the present invention figures out the surge suppressing effect accurately and a method for manufacturing a product conforming to a practical demand depending on a customer's requirement will further be given as the following. For allowing a formula to be performed mathematical calculation smoothly, any corresponding element notation will not be marked during the following description. It is hereby stated.

Besides, for conveniently giving an example to perform mathematical calculations, the most basic circuit according to the present invention shown in FIG. 7 is especially used for explanation. The circuit is similarly constituted by coupling a plurality of surge suppression elements (MOVs) to chokes 3 by means of continuous series connection as the figure show, in which the same specification of surge suppression element 1 (MOV) and the choke 2 may similarly be adopted. The circuit may be applied for the protection on a communication circuit 51 and facilities similar thereto.

Remnant voltage and remnant energy at two ends of a protected facility in the figure may be represent by the following mathematic expression.

A mathematic theoretical deduction of a method according to the present invention bases on an assumption that the specifications of the MOVs and the chokes used in each layer are the same. Approximate 50% of the surge current enters the MOVs and remnant 50% of the surge current then enters the chokes.

Therefore, $i=i_1'+i_1=2i_1, (i_1'=i_1), i_1'=i_2+i_2'=2i_2, (I_2'=i_2-$ - -

The surge current entering into the current shown in FIG. 7 is $i=i_1'+i_1$ in which corresponding points P1~P10 marked in the figure respectively represent:

P1 represents a clamping voltage $V_{c1}$ of a first layer, $i_1'$ is a surge current flowing through the MOV.

P2, P3 respectively represent a voltage between two ends of the choke of the first layer $2V_{L1}=2L_1 \times di_1/dt$.

P4 represents a clamping voltage $V_{c2}$ of a second layer, $i_2'$ is a surge current flowing through the MOV.

P5, P6 respectively represent a voltage between two ends of the choke of the second layer $2V_{L2}=2L_2 \times di_2/dt$.

P7 represents a clamping voltage $V_{cn}$ of a nth layer, $i_n'$ is a surge current flowing through the MOV.

P8, P9 respectively represent a voltage between two ends of the choke of the nth layer $2V_{Ln}=2L_n \times di_n/dt$.

P10 represents a remnant surge voltage between two ends of a protected facility.

$$V_{C1} = 2V_{L1} + V_{C2}$$
$$V_{C2} = 2V_{L2} + V_{C3}$$
$$\vdots$$
$$V_{Cn} = 2V_{Ln} + V_{Cn+1}$$

and $$V_{L1} = \left(L \times \frac{di_1}{dt}\right) = (1/2)^1 \times \left(L \times \frac{di}{dt}\right)$$
$$V_{L2} = \left(L \times \frac{di_2}{dt}\right) = (1/2)^2 \times \left(L \times \frac{di}{dt}\right)$$
$$\vdots$$
$$V_{Ln} = \left(L \times \frac{di_n}{dt}\right) = (1/2)^n \times \left(L \times \frac{di}{dt}\right)$$

Thus, a mathematic expression of the clamping voltage $V_{C1}$ of the MOV of the first layer is the following:

$$V_{C1} = 2V_{L1} + 2V_{L2} + \cdots + 2V_{Ln} + V_{Cn+1}$$
$$V_{C1} = 2(V_{L1} + V_{L2} + \cdots + V_{Ln}) + V_{Cn+1}$$
$$V_{Cn+1} = V_{C1} - 2(V_{L1} + V_{L2} + \cdots + V_{Ln})$$
$$V_{Cn+1} = V_{C1} - 2(L \times di_1/dt + L \times di_2/dt + \cdots + L \times di_n/dt)$$
$$V_{Cn+1} = V_{C1} - 2[(½) \times (L \times di/dt + (½)^2 \times L \times di/dt + \cdots + (½)^n \times L \times di/dt)]$$
$$V_{Cn+1} = V_{C1} - 2L \times di/dt[(½) + (½)^2 + \cdots + (½)^n]$$
$$V_{Cn+1} = V_{C1} - 2L \times di/dt[2 - (½)^n]$$

Thereby being able to obtain:

$$V_{Cn+1} = V_{C1} - [4 - (½)^{n-1}](L \times di/dt) \quad \text{formula (1)}$$

When $n=1$, $V_{Cn+1} = V_{C1} - 3(L \times di/dt)$; when $n=\infty$, $V_{Cn+1} = V_{C1} - 4(L \times di/dt)$. The clamping voltage of the first layer $V_{C1}$ and the clamping voltage of the nth layer $V_{Cn+1}$ (i.e. the remnant surge voltage between the two ends of the protect facility) are laid in between $V_{C1} - 3(L \times di/dt)$ and $V_{C1} - 4(L \times di/dt)$.

From the formula (1) we can know that inductance L and a surge discharge current form a negative relationship. The remnant surge voltage between the two ends of the protected facility lowers as the surge current increases. Therefore, this method is able to suppress the surge voltage more than a conventional method.

Energy $E_{absorb}$ absorbed when the surge current invade in FIG. 7 can be expressed as the following mathematic expression according to the method:

$$E_{absorb} = (i_1')^2 R + 2(1/2)L(i_1)^2 + (i_2')^2 R + 2(1/2)L(i_2)^2 + \ldots +$$
$$(i_n')^2 R + 2(1/2)L(i_n)^2$$
$$= R \times [(i_1')^2 + (i_2')^2 + \ldots (i_n')^2] + L[(i_1)^2 + (i_2)^2 + \ldots + (i_n)^2]$$

Because $$i = i_1' + i_1 (i_1' = i_1), i_1' = i_2 + i_2' (i_2' = i_2), \ldots$$

$$E_{absorb} = R \times [(i_1')^2 + 1/2(i_1')^2 + (1/2)^2(i_1')^2 + \ldots +$$
$$(1/2)^n(i_1')^2] + 2 \times (1/2)L[(i_1)^2 + 1/2(i_1)^2 +$$
$$(1/2)^2(i_1)^2 + \ldots + (1/2)^n(i_1)^2]$$
$$= (R+L)[(i_1')^2 + 1/2(i_1')^2 + (1/2)^2(i_1')^2 + \ldots +$$
$$(1/2)^n(i_1')^2]$$
$$= (R+L)[(i_1)^2 + 1/2(i_1)^2 + (1/2)^2(i_1)^2 + \ldots +$$
$$(1/2)^n(i_1)^2]$$
$$= (R+L)(i_1')^2 \times [1 + 1/2 + (1/2)^2 + \ldots + (1/2)^n]$$

The following result can finally be obtained:

$$E_{absorb} = (R+L)(i_1)^2[2 - (½)^n] \quad \text{formula (2)}$$

When $n=1$, $E_{absorb}=1.5(R+L)(i_1)^2$; when $n=\infty$, $E_{absorb}=2(R+L)(i_1)^2$. Energy absorbed when the surge invades is laid in between $1.5(R+L)(i_1)^2$ and $2(R+L)(i_1)^2$ according to the method of the present invention.

Thus, the following result can be obtained:

Remnant energy of protected facility=Total surge energy−absorbed invasion energy $$E_{remnant} = E_{totalsurge} - E_{absorb} \quad \text{formula (3)}$$

Because the surge suppressing effect generated from a series surge suppression structure of the present invention can be derived clearly from the aforementioned formulas (1) to know the remnant surge voltage between the two ends of the protect facility, formulas (2) and (3), remnant energy of a protected facility can be made clear so as to be able to improve the deficits of a conventional method.

In addition, because FIG. 7 shows the most basic circuit according to the present invention, FIG. 2 shows a derivative application of the circuit shown in FIG. 7 in which a ground line is added and FIGS. 5 and 6 respectively further show a broad derivative application of the circuit shown in FIG. 2, the operational manners and theories are all identical.

Therefore, the customization can be achieved through the reverse application and deduction of the formulas (1), (2) and (3); how many layers of chokes 2 and the value and specification of inductance L of each choke need to be correspondingly used to manufacture a product conforming to the practical demand can be known through a simple conversion depending on a different power voltage (including AC and DC) and load current requirement of electric facilities or communication facilities.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A series surge suppression structure, comprising: a circuit board, a grounding line and a plurality of galvanization circuits being disposed thereon, a multilayer surge absorption unit being disposed in series on said ground line and said plurality of galvanization circuits, said each galvanization circuit being formed by connecting a plurality of chokes thereon together in series, said each surge absorption unit being constituted by a pair of parallel chokes and a layered surge suppression element connected between one end of said either choke and said ground line; a power connection terminal, positioned on one side of said circuit board and electrically connected to a final end of said multilayer surge absorption unit; and a protection terminal, positioned on another side of the circuit board, and electrically connected to a final end of another side of said multilayer surge absorption unit; whereby, said protection terminal is used to connect a communication circuit or an electric facilities and said power connection terminal is used to connect to an external wire to form a multilayer surge absorption protection by means of series connection.

2. The series surge suppression structure according to claim 1, wherein said surge suppression elements at the same layer assumes a Y-typed disposition.

3. The series surge suppression structure according to claim 1, wherein said surge suppression elements at the same layer assumes a delta type disposition.

4. The series surge suppression structure according to claim 1, wherein said chokes are disposed distantly on a middle part of said circuit board, and said surge suppression elements are respectively disposed on two sides of said circuit board by a distance.

5. The series surge suppression structure according to claim 1, wherein said surge suppression elements are disposed on a middle part of said circuit board by a distance, and said chokes are respectively disposed on two sides of said circuit board by a distance.

6. The series surge suppression structure according to claim 1, wherein said surge suppression elements and said chokes are disposed on said circuit board by a distance by means of alternate permutation.

7. The series surge suppression structure according to claim 1, wherein said structure is set to be a module by a standard specification to provide different power specifications of facilities with selection and assembly uses.

8. A series surge suppression structure, comprising: a plurality of modules, disposed in parallel, said each module being constituted by a circuit board with a ground line and a plurality of galvanization circuits disposed thereon, a multilayer surge absorption unit being disposed in series on said ground line and said plurality of galvanization circuits, said each galvanization circuit being formed by connecting a plurality of chokes thereon together in series, said each surge absorption unit being constituted by a pair of parallel chokes and a layered surge suppression element connected between one end of said either choke and said ground line; one side of said each module being disposed with a power connection terminal, another side thereof being disposed with a protection terminal, said power connection terminal being disposed at one side of said circuit and electrically connected to a final end of said multilayer surge absorption unit, and said protection terminal being disposed at another side of said circuit board and electrically connected to a final end of another side of said multilayer surge absorption unit; whereby, said protection terminals of said multiple of modules are connected together and then connected with a communication circuit or electric facilities, and power connection terminals thereof are connected together and then connected with an external wire so as to attain to a three-phase series-connection multilayer surge absorption protection.

9. The series surge suppression structure according to claim 8, wherein said three modules are disposed on said structure, said protection terminals and said power connection terminals are connected together to form a Y-typed disposition.

10. The series surge suppression structure according to claim 8, wherein said three modules are disposed on said structure, said protection terminals and said power connection terminals are connected together to form a delta type disposition.

11. The series surge suppression structure according to claim 1, wherein specifications of said surge suppression element and said chokes disposed on said surge absorption unit at said each layer are set to be the same to allow approximate 50% of a surge current to enter said surge suppression elements at said each layer, and remnant 50% thereof to enter said chokes.

12. The series surge suppression structure according to claim 11, wherein said surge absorption units are set to be n layers, and have: a known formula (1), in which a remnant surge voltage at a nth layer is $V_{Cn+1}=V_{C1}-[4-(1/2)^{n-1}](L\times di/dt)$; a known formula (2), in which absorbed energy while being invaded by a surge if there are n layers is $E_{absorb}=(R+L)(I_1)^2[2-(1/2)^n]$; and a known formula (3), in which remnant energy of protected facility=total surge energy−absorbed invaded energy $E_{remnant}=E_{total\ surge}-E_{absorb}$; whereby, 1∼n layers of chokes, and values and specifications of inductances thereof are correspondingly set depending on customization to enable a manufactured product to conform to the practical demand.

13. The series surge suppression structure according to claim 8, wherein specifications of said surge suppression element and said chokes disposed on said surge absorption unit at said each layer are set to be the same to allow approximate 50% of a surge current to enter said surge suppression elements at said each layer, and remnant 50% thereof to enter said chokes.

14. The series surge suppression structure according to claim 13, wherein said surge absorption units are set to be n layers, and have: a known formula (1), in which a remnant surge voltage at a nth layer is $V_{Cn+1}=V_{C1}-[4-(1/2)^{n-1}](L\times di/dt)$;

a known formula (2), in which absorbed energy while being invaded by a surge if there are n layers is $E_{absorb}=(R+L)(I_1)^2[2-(1/2)^n]$; and a known formula (3), in which remnant energy of protected facility=total surge energy−absorbed invaded energy $E_{remnant}=E_{total\ surge}-E_{absorb}$; whereby, 1∼n layers of chokes, and values and specifications of inductances thereof are correspondingly set depending on customization to enable a manufactured product to conform to the practical demand.

\* \* \* \* \*